US008583803B2

(12) United States Patent
Bhayani (10) Patent No.: US 8,583,803 B2
(45) Date of Patent: Nov. 12, 2013

(54) MECHANISM FOR TRANSPARENT LOAD BALANCING OF MEDIA SERVERS VIA MEDIA GATEWAY CONTROL PROTOCOL (MGCP) AND JGROUPS TECHNOLOGY

(75) Inventor: Amit Bhayani, Maharashtra (IN)

(73) Assignee: Red Hat, Inc., Raleigh, NC (US)

( * ) Notice: Subject to any disclaimer, the term of this patent is extended or adjusted under 35 U.S.C. 154(b) by 824 days.

(21) Appl. No.: 12/615,933

(22) Filed: Nov. 10, 2009

(65) Prior Publication Data

US 2011/0113140 A1    May 12, 2011

(51) Int. Cl.
*G06F 15/16* (2006.01)
*H04L 29/08* (2006.01)

(52) U.S. Cl.
CPC .... *H04L 29/08144* (2013.01); *H04L 29/08576* (2013.01)
USPC ............................ 709/227; 709/226; 709/228

(58) Field of Classification Search
USPC .......... 379/352, 401, 230, 226; 709/220–229
See application file for complete search history.

(56) References Cited

U.S. PATENT DOCUMENTS 6,691,165 B1 * 2/2004 Bruck et al. .................. 709/227
7,613,111 B2 * 11/2009 Soncodi ........................ 370/230
2002/0154646 A1 * 10/2002 Dubois et al. ................. 370/406
2005/0286496 A1 * 12/2005 Malhotra et al. .............. 370/352
2007/0255829 A1 * 11/2007 Pecus et al. ................... 709/225

OTHER PUBLICATIONS

Ban, "A simple clustered task distribution system", pub. Sep. 2008.*
QNX, "QNX Powers Universal Media Gateway for Next-Generation Digital Video Networks", published on May 10, 2004.*
"JBoss Microcontainer", http://www.jboss.org/jbossmc/, archived on May 10, 2009.*
"JGroups—A Toolkit for Reliable Multicast Communication", http://www.jgroups.org/, archived on Jun. 5, 2009.*
Red Hat, Inc. "JBoss Communications Platform 1.2, 1.2.2 Release Notes", published before Dec. 31, 2009.*

* cited by examiner

*Primary Examiner* — Asad Nawaz
*Assistant Examiner* — Zhaohui Yang
(74) *Attorney, Agent, or Firm* — Lowenstein Sandler LLP (57) ABSTRACT

A mechanism for transparent load balancing of media servers via Media Gateway Control Protocol (MGCP) and JGroups technology is disclosed. A method of embodiments of the invention includes receiving a request from a caller to connect with a media server controlled by a media gateway controller (MGC), sending a command to establish a connection between the caller and the media server to a media gateway control protocol (MGCP) stack of the MGC, wherein the command includes a unique identifying name of a cluster that is communicably coupled to the MGC and hosts one or more media servers including the media server, and leveraging JGroups to identify the one or more media servers in the cluster and select one of the identified media servers in the cluster to connect to the caller based on a load-balancing policy implemented by the MGC.

20 Claims, 5 Drawing Sheets

MECHANISM FOR TRANSPARENT LOAD BALANCING OF MEDIA SERVERS VIA MEDIA GATEWAY CONTROL PROTOCOL (MGCP) AND JGROUPS TECHNOLOGY

TECHNICAL FIELD

The embodiments of the invention relate generally to media servers on a telecommunications platform and, more specifically, relate to a mechanism for transparent load balancing of media servers via Media Gateway Control Protocol (MGCP) and JGROUPS technology.

BACKGROUND

With the continued progress of globalization, more corporations than ever before have workgroups spread across countries and continents across the world. To support and increase the productivity of remote and telecommuting workgroups, communications companies are considering more cost effective network services and solutions that combine voice, wireless, data and video functionality. Acquiring these desired network services and solutions requires connections from the Internet and wireless and wired networks to Public Switched Telephone Networks (PSTNs) using a flexible, robust, scalable and cost-effective media gateway.

Today, all communications can be routed through computers. Widespread access to broadband Internet and the ubiquity of Internet Protocol (IP) enable the convergence of voice, data and video. Media gateways provide the ability to switch voice media between a network and its access point. Using Digital Subscriber Line (DSL) and fast-Internet cable technology, a media gateway converts, compresses, and packetizes voice data for transmission back-and-forth across the Internet backbone for wired and wireless phones. Media gateways sit at the intersection of the PSTNs and wireless or IP-based networks.

Multiple market demands are pushing companies to converge all of their media services using media gateways with VoIP capabilities. As such, the development of media servers has allowed this convergence of media services into media gateways with VoIP capabilities. A media server is responsible for sending a continuous stream of data representing audio, video or other media in real-time. In the telecommunications industry there are different standards derived by IETF and other organizations on how a media server, also known as a media gateway (MG), can be controlled by applications. Applications controlling the MG are known as media gateway controllers (MGCs). Different standards like Media Gateway Control Protocol (MGCP) as defined in RFC-3435, MEGACO defined in RFC-3525, and MSML defined in RFC-4722, for example, are used to control a MG from a MGC.

An important feature for MG systems is load balancing among multiple MGs. When more than one MG (a "node") is running in a "cluster" of MG nodes, there is generally a MGC that is controlling the many MGs. The MGC has knowledge of each node in the cluster that is statically configured in the MGC, and it explicitly makes decisions on when to use a particular node in order to evenly balance load among the cluster. Currently, the number of nodes in a cluster is predetermined and fixed in the MGC. The MGC is not able to handle additional nodes being added to the cluster during runtime, and cannot handle the removal of nodes from a cluster during runtime. As such, a mechanism to achieve transparent load balancing by an MGC without the MGC having to be aware of the number of MG nodes in a cluster would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for a mechanism for transparent load balancing of media servers via Media Gateway Control Protocol (MGCP) and JGROUPS technology. A method of embodiments of the invention includes receiving a request from a caller to connect with a media server controlled by a media gateway controller (MGC), sending a command to establish a connection between the caller and the media server to a media gateway control protocol (MGCP) stack of the MGC, wherein the command includes a unique identifying name of a cluster that is communicably coupled to the MGC and hosts one or more media servers including the media server, and leveraging JGROUPS to identify the one or more media servers in the cluster and select one of the identified media servers in the cluster to connect to the caller based on a load-balancing policy implemented by the MGC.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for transparent load balancing of media servers via Media Gateway Control Protocol (MGCP) and JGROUPS technology. Embodiments of the invention utilize the MGCP protocol for load-balancing and JGROUPS for automatic discovery of nodes in cluster to enable embodiments of the invention. In one embodiment, a request at an MGC to establish a connection with an MG is sent by the MGC without any specific host address or IP address; instead, the request is sent to a cluster name. Once the request is dispatched by the MG, the JGROUPS layer knows how to route this request to a particular node in the cluster depending on the predefined load balancing policy (e.g., round-robin or load based). As such, a result of embodiments of the invention is that the MGC is not required to have knowledge of MG nodes in a cluster at any point of time and can perform load-balancing in a transparent way.

Figure 1:
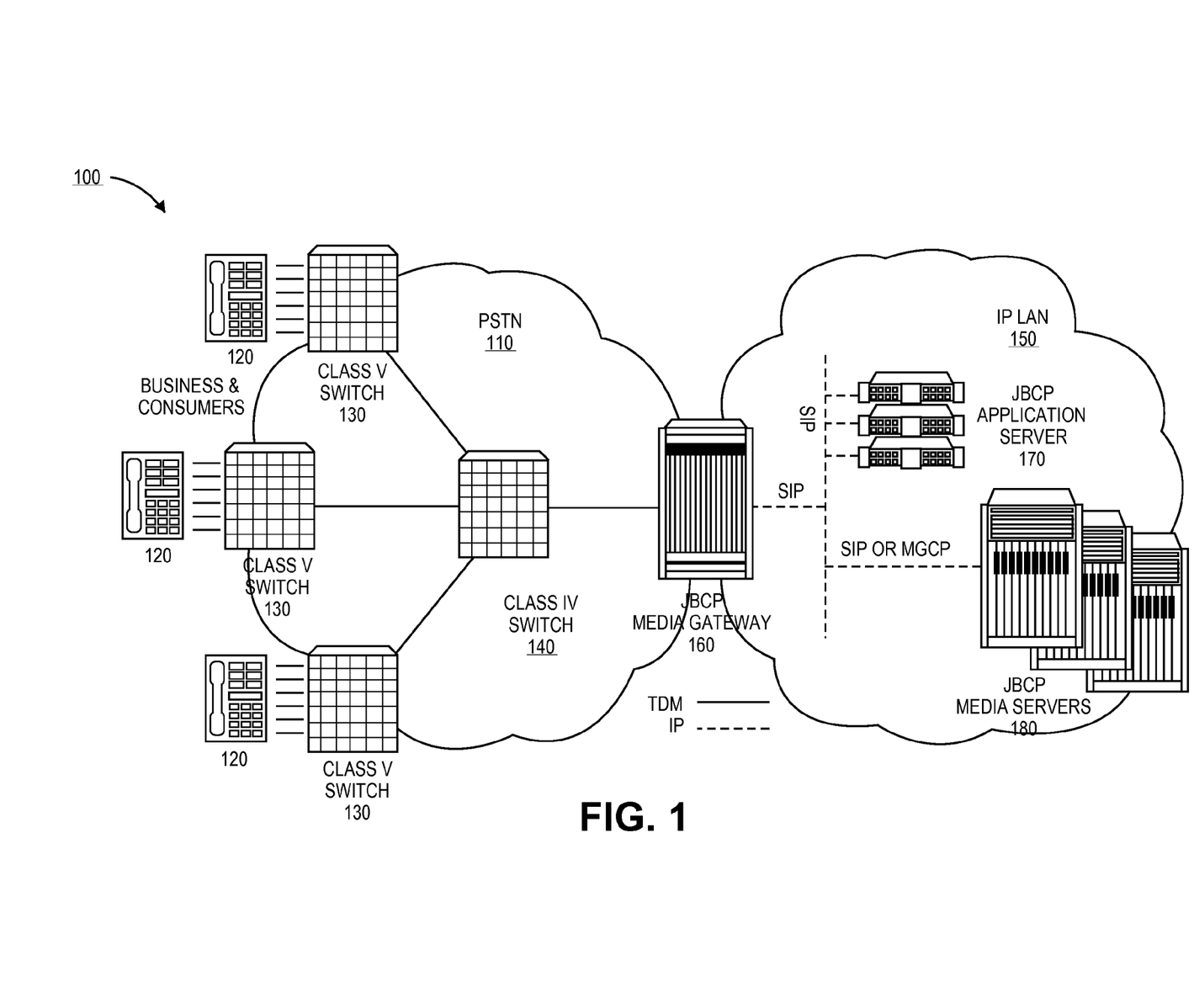
FIG. 1 is a block diagram of a communications network implementing transparent real-time media server load balancing according to an embodiment of the invention.

FIG. 1 is a block diagram of a communications network 100 implementing transparent real-time media server load balancing according to an embodiment of the invention. Communication network 100 includes a Public Switched Telephone Network (PSTN) 110 and an Internet Protocol Local Area Network (IP LAN) 150. The PSTN 110 transports circuit-switched signals, while the IP LAN 150 transports IP packets.

Within the PSTN 110, one or more businesses or consumers may place calls via telephones 120. Telephones 120 are connected to class V switches 130. Class V switches 130 are telephone switches or exchanges that directly serve subscribers. The class V switches 130 are in turn connected to a class IV switch 140. The Class IV switch 140 is a tandem switch or exchange connecting the various areas of a city or towns in a region, and is not directly connected to the end user or subscriber.

The class IV switch 140 is connected to the IP LAN 150 via a Media Gateway 160 that may include one or more computing devices. In one embodiment, the media gateway 160 is a JBoss™ Communications Platform server. One task of the media gateway 160 is to convert PSTN signals into IP packets and vice versa. The media gateway 160 may also operate as a Session Border Controller at the boundaries of the IP LAN 150.

IP LAN 150 may also include one or more application servers 170, such as JBoss™ application servers, that may reside on one or more computing devices. Lastly, the IP LAN 150 may include one or more load balanced media servers 180 that may reside on the same or different computing devices. In one embodiment, the media servers 180 are Mobicents™ Media Servers.

Media servers 180 offer a complete media gateway (MG) and server solution. Some capabilities of media servers 180 include, but are not limited to, digital signal processing to convert and compress voice circuit-switched signals into IP packets, announcement access points, conferencing, and high-level interactive voice response (IVR) engines. Media servers 180 are typically controlled by an external application server 170, such as a JBoss™ Communications Platform (JBCP) application server, which implements call control logic also known as Media Gateway Controller (MGC). In embodiments of the invention, media servers 180 each forms a node of the cluster, as further described below.

Figure 2:
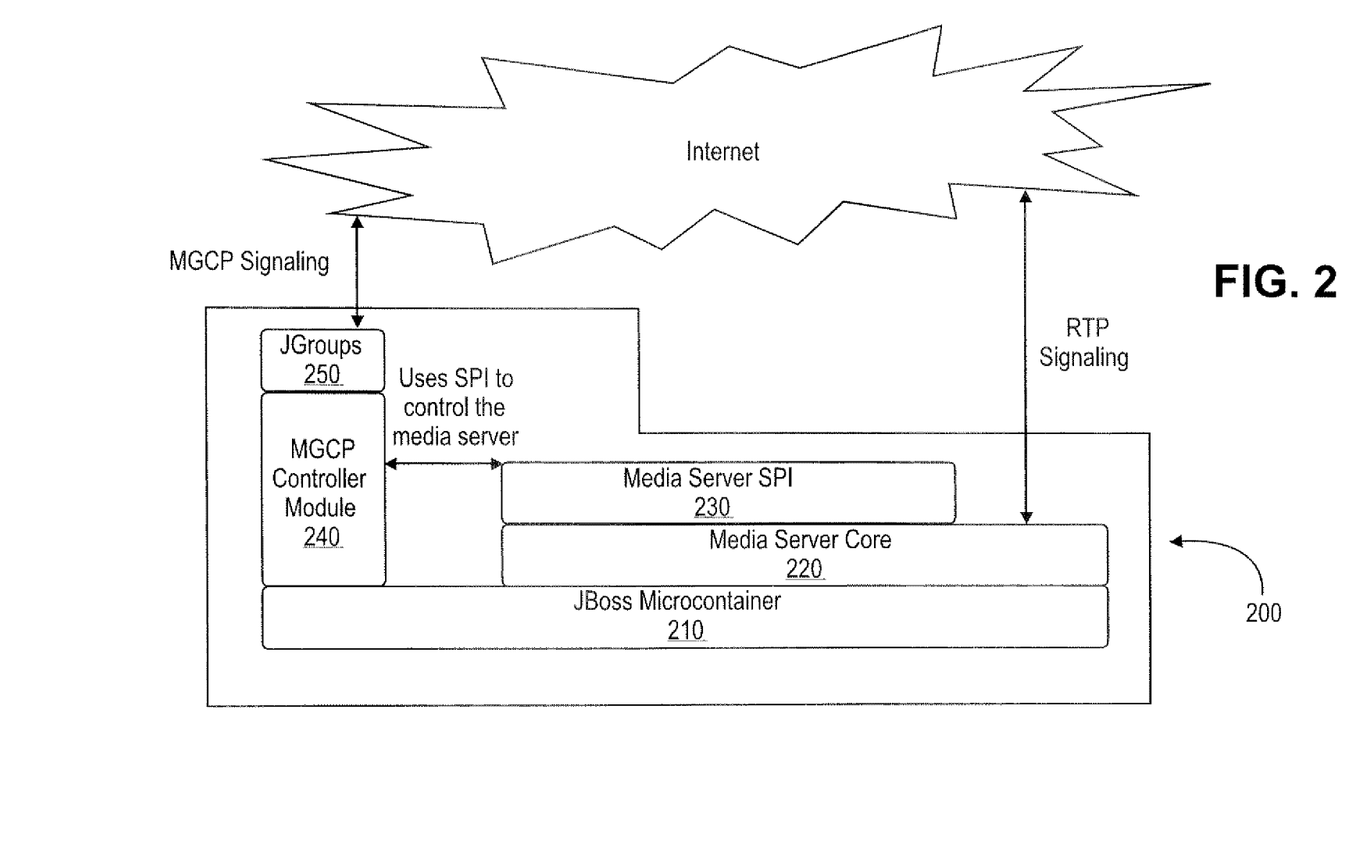
FIG. 2 is a block diagram of showing further detail of a media server capable of implementing transparent load balancing according to an embodiment of the invention.

FIG. 2 is a block diagram showing further detail of a media server 200 capable of implementing transparent load balancing according to an embodiment of the invention. In one embodiment, media server 200 is the same as media server 180 described with respect to FIG. 1 and may reside on a designated machine or share a machine with other media servers. In some embodiments, as shown in FIG. 2, media server 200 is developed on top of existing JAVA technologies. The JAVA platform offers a single, unifying programming model that can connect all elements of a business infrastructure. The modularization effort may be supported by the use of the JBoss™ Microcontainer 210. Using the JBoss™ Microcontainer architecture, the Media Server Core and other modules like MGCP Controller can be deployed as Plain Old Java Object's (POJO). The Microcontainer manages the life cycle of POJO's and is easily configurable through the XML files or annotations.

In one embodiment, the MGCP Controller Module 240 is MGCP stack that listens for incoming requests and has direct access to media server Service Provider Interface (SPI) 230 to control the media server core 220. In some embodiment, the media server core may include resources such as a player, recorder, tone generator/detector, and so on (not shown). The MGCP controls the resources of the media server.

In one embodiment, the MGCP Controller does not directly send commands to the Internet, but instead leverages the JGROUPS 250 technology for auto-discovery of other media server nodes in a cluster for transparent load balancing purposes. JGROUPS 250 is a toolkit for reliable group communication. As a result, media servers may join a cluster, send messages to all member nodes or single members, and receive messages from members in the group. JGROUPS 250 keeps track of all of the members (nodes) in every group (cluster), and notifies group members when a new member joins, or an existing member leaves or crashes. A group is identified by its name (unique cluster name). Groups do not have to be created explicitly; when a process joins a non-existing group, that group will be created automatically. Member processes of a group can be located on the same host, within the same LAN, or across a WAN. A member can also be part of multiple groups. JGROUPS 250 may reside on the same machine as MGCP controller or on a different machine.

Figure 3:
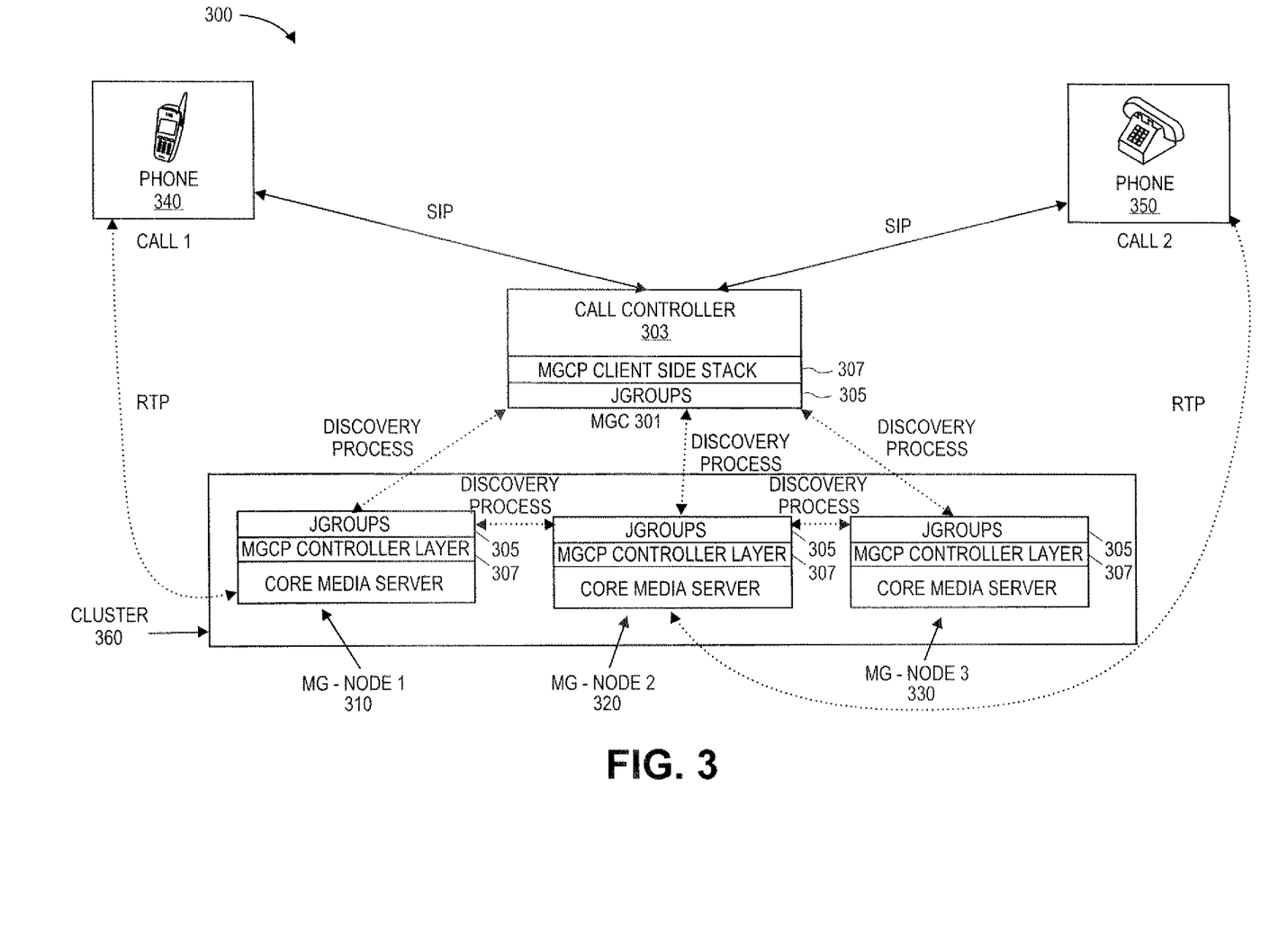
FIG. 3 is a block diagram of a transparent load balanced media server system according to an embodiment of the invention.

FIG. 3 is a block diagram of a transparent load balanced media server system 300 according to an embodiment of the invention. Media server system 300 includes a cluster 360 of media servers 310, 320 330 controlled by a MGC 301 that may reside on a designated machine or share a machine with other components. In one embodiment, each of media servers 310, 320, 330 are the same as media server 200 described with respect to FIG. 2. Media servers 310, 320, 330 are transparently load balanced according to embodiments of the invention.

Media server system 300 further includes different types of callers, such as a cell phone caller 340 and a land line caller 350, that are each capable of initiating a bidirectional stream of media (e.g., audio, video, etc.) with a selected media server 310, 320, 330. In one embodiment, the connection between phones 340 and 350 and the media servers 310-330 is over Real-Time Transport Protocol (RTP), which carries audio and video signals. Along with the RTP connection, the phones 340, 350 are also connected to MGC 301 using Session Initiation Protocol (SIP).

In one embodiment, the SIP connection between the phones 340, 350 and MGC 301 is established first and then the settings related to establishing the RTP connection between the media servers 310-330 and the phones 340, 350 are negotiated via this SIP connection. Then, when the settings are agreed upon, the RTP connection is established. MGC 301 is responsible for the SIP portion (e.g., signaling) of the communication with phones 340, 350. The media servers 310-330 are responsible for the RTP portion (e.g., media) of the communication, which occurs after the SIP session is established. MGC 301 controls the media servers 310-330 transparently using the media server control interface MGCP 307.

In one embodiment, MGC 301 uses an MGCP stack 307 that leverages JGROUPS 305 to identify the media server nodes 310-330 in the cluster 360 and perform load balancing between these identified media server nodes 310-330. In addition, MGC 301 may command the media servers 310-330 to execute various operations, such as playing a file or playing some sequence of signals. In one embodiment, the MGC 301 oversees the implementation of transparent media server load balancing by leveraging JGROUPS 305.

For purposes of illustration of embodiments of the invention, assume a new phone call is initiated by caller 340. Initially, caller 340 makes a connection with MGC 301 via SIP. MGC 301 creates a new MGCP Command for establishing an RTP connection between caller 340 and a media server 310-330. This new command is forwarded to the MGCP Stack 307 that leverages JGROUPS 305 for determination of a media server node 310-330 to handle the call. The unique name of the cluster 360 is set in the command instead of an IP address or hostname of a particular media server node 310-330, so that JGROUPS 305 knows that it has to select a node from a particular cluster. JGROUPS 305 is utilized to identify the currently existing media servers 310-330 in the cluster 360 identified in the command. Based on the identified media servers 310-330 in cluster 360, JGROUPS 305 selects a media server node 310-330 based on a current load-balancing policy to connect with caller 340 via RTP.

Continuing with the illustration, assume that media server node1 310 is selected by JGROUPS 305 for connection to caller 340. At this point, media server node1 310 simulates a callee to caller 340. Media server node1 310 is capable of performing actions, such as playing announcements, detecting key presses, and other events for the caller 340. These actions are not only provided to the caller 340, but also forwarded on to MGC 301. A state is associated with the call and may include an address of the caller 340, what buttons the caller 340 has pressed, and/or what events are associated with the caller 340, to name a few examples. Media server node1 310 does not keep this state; rather, it is kept by the MGC 301. Specifically, the MGCP Stack 307 of MGC 301 keeps the state of the call in order to handle subsequent requests associated with the same call. Thus, any additional requests arriving at the MGC 301 for the same call can be forwarded to the same media server 310-330 in the cluster 360 (as long as it still exists) which was previously handling the call.

In one embodiment, if a new request for creation of another call arrives at the MGC 301, for example a new request coming from caller 350, MGC 301 creates a new MGCP Command (with the cluster 360 to direct the command identified) and forwards it to the MGCP Stack 307 that leverages JGROUPS 305. JGROUPS 305 is then utilized to identify media server nodes 310-330 and determine which identified media server node 310-330 is to be selected for load balancing purposes.

In some embodiments of the invention, additional media server nodes may be added to the cluster 360 or media server nodes may be removed from the cluster 360 at runtime depending on the load in the cluster 360. The MGC 301 is not aware of this addition or deletion. Instead, as discussed above, JGROUPS 305 is utilized to identify the addition or deletion of media server nodes during runtime. As a result, any commands fired for each new call by MGC 301 may be routed to any newly-added media server nodes. Furthermore, in the case of removal of a media server node, any commands from MGC 301, even those related to a currently-existing call, would not be fired to a media server node that is taken out of the cluster 360. If a media server node is removed that was handling a currently-existing call, then JGROUPS 305 determines a different media server that can handle the call. This is possible because the state of this currently-existing call is kept at the MGCP Stack 307 of MGC 301.

Continuing with the illustration, assume that media server node1 310 is selected by JGROUPS 305 for connection to caller 340. At this point, media server node1 310 simulates a callee to caller 340. Media server node1 310 is capable of performing actions, such as playing announcements, detecting key presses, and other events for the caller 340. These actions are not only provided to the caller 340, but also forwarded on to MGC 301. A state is associated with the call and may include an address of the caller 340, what buttons the caller 340 has pressed, and/or what events are associated with the caller 340, to name a few examples. Media server node1 310 does not keep this state; rather, it is kept by the MGC 301. Specifically, the MGCP Stack 307 of MGC 301 keeps the state of the call in order to handle subsequent requests associated with the same call. Thus, any additional requests arriving at the MGC 301 for the same call can be forwarded to the same media server 310-330 in the cluster 360 (as long as it still exists) which was previously handling the call.

In one embodiment, if a new request for creation of another call arrives at the MGC 301, for example a new request coming from caller 350, MGC 301 creates a new MGCP Command (with the cluster 360 to direct the command identified) and forwards it to the MGCP Stack 307 that leverages JGROUPS 305. JGROUPS 305 is then utilized to identify media server nodes 310-330 and determine which identified media server node 310-330 is to be selected for load balancing purposes.

In some embodiments of the invention, additional media server nodes may be added to the cluster 360 or media server nodes may be removed from the cluster 360 at runtime depending on the load in the cluster 360. The MGC 301 is not aware of this addition or deletion. Instead, as discussed above, JGROUPS 305 is utilized to identify the addition or deletion of media server nodes during runtime. As a result, any commands fired for each new call by MGC 301 may be routed to any newly-added media server nodes. Furthermore, in the case of removal of a media server node, any commands from MGC 301, even those related to a currently-existing call, would not be fired to a media server node that is taken out of the cluster 360. If a media server node is removed that was handling a currently-existing call, then JGROUPS 305 determines a different media server that can handle the call. This is possible because the state of this currently-existing call is kept at the MGCP Stack 307 of MGC 301.

Figure 4:
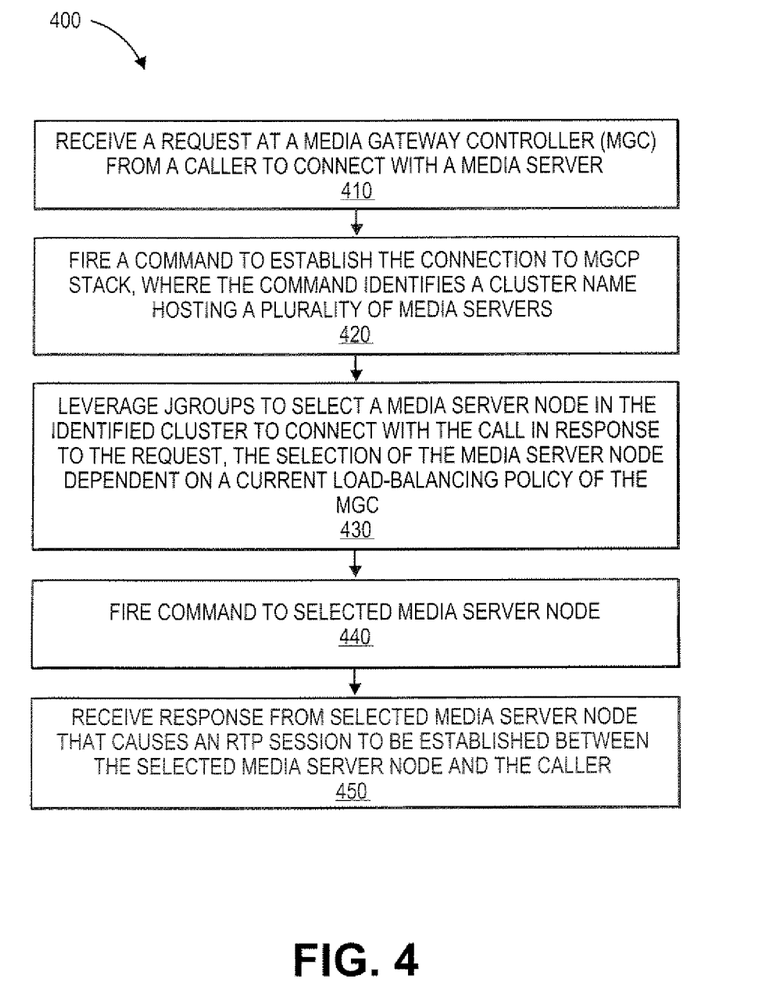
FIG. 4 is a flow diagram illustrating a method for transparent media server load balancing according to an embodiment of the invention.

FIG. 4 is a flow diagram illustrating a method 400 for transparent media server load balancing according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by media server system 300 of FIG. 3.

Method 400 begins at block 410 where a request is received by an MGC from a caller to connect with a media server. In one embodiment, the request is a SIP request with the intention to establish an RTP connection and exchange media. In another embodiment, the request to connect is for purposes of at least one of playback of a file, a scheduled task, and generation of a dual-tone multi-frequency (DTMF) sequence signal. At block 420, the MGC creates a respective command and fires it over to an MGCP Stack. The command identifies a cluster name, where two or more media servers are member of this cluster. This cluster name is in lieu of setting an IP address or hostname of a media server in the command.

Subsequently, when MGCP Stack receives the command, it leverages JGROUPS to identify the available media server nodes in the named cluster in block 430. The discovery of media server nodes in a cluster is accomplished by JGROUPS using multicast pings, as described in JGROUPS technology documentation. In addition, a media server node from the cluster is selected based on a load balancing policy implemented by the MGC. In one embodiment, the MGC implements the load balancing policy in a way that is transparent to JGROUPS. JGROUPS is mostly used for discovery of nodes and forming/removing clusters. At block 440, the command is then fired to the selected media server node. At block 450, a response from the corresponding selected media server node is received at the MGC that allows a RTP session to be established between the called and the selected media server node.

Figure 5:
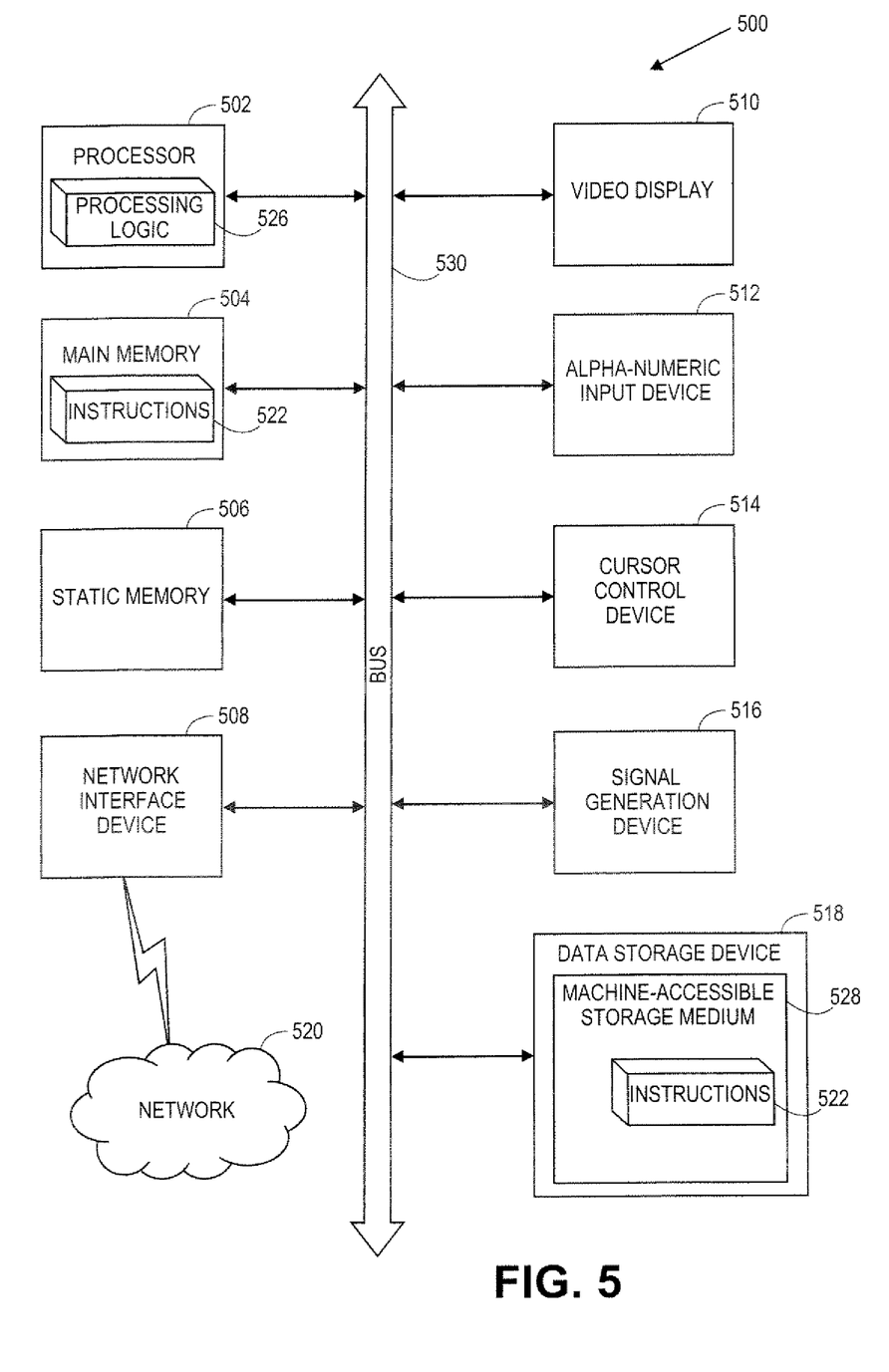
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform method 400 for transparent load balancing of media servers via Media Gateway Control Protocol (MGCP) and JGROUPS technology described with respect to FIG. 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
    receiving, at a media gateway controller (MGC) device, a request from a caller to connect with a media server;
    sending, by the MGC device to a media gateway control protocol (MGCP) stack of the MGC device, a command to establish a connection between the caller and the media server, wherein the command comprises a name of a cluster that is communicably coupled to the MGC device and hosts one or more media servers comprising the media server;
    utilizing a Layer 3 multicast communications toolkit, by the MGC device via the MGCP stack, to:
    identify the one or more media servers in the cluster; and
    select one of the identified media servers in the cluster to connect to the caller based on a load-balancing policy implemented by the MGC device;
    maintaining, via the MGCP stack, a state of a connection between the caller and the selected one of the identified media server; and
    referencing, via the Layer 3 multicast communications toolkit, the maintained state of the connection at the MGCP stack when a media server is added or removed from the cluster.

2. The method of claim 1, further comprising:
    sending the command to the selected media server; and
    receiving a response to the command from the selected media server that causes a connection to be established between the caller and the selected media server.

3. The method of claim 2, wherein a connection between the caller and the MGC is via a Session Initiation Protocol (SIP) connection, and wherein the connection between the caller and the selected media server is via a Real-Time Transport Protocol (RTP) connection.

4. The method of claim 1, wherein the request to connect is for purposes of at least one of playback of a file, a scheduled task, or generation of a dual-tone multi-frequency (DTMF) sequence signal.

5. The method of claim 1, wherein the one or more media server of the cluster utilize a application server microcontainer architecture.

6. The method of claim 1, wherein the MGC is a communications platform application server.

7. The method of claim 1, wherein any additional requests to the MGC associated with the connection between the caller and the selected media server are sent to the selected media server.

8. The method of claim 1, wherein additional media servers may be added to the cluster during runtime and any of the one or more media servers may be removed from the cluster during runtime, and wherein the Layer 3 multicast communications toolkit is aware of the additional media servers and the removed media servers.

9. A system, comprising:
    a memory;
    a processing device communicably coupled to the memory; and
    a media gateway controller (MGC) executable from the memory by the processing device, the MGC communicably coupled to a cluster of media service to control the media servers, the MGC to:
    receive a request from a caller to connect with any media server of the cluster;
    send a command to a media gateway control protocol (MGCP) stack of the MGC, wherein the command to establish a connection between the caller and one of the media servers of the cluster and comprising a name of the cluster;
    utilize a Layer 3 multicast communications toolkit, via the MGCP stack, to:
    identify the media servers in the cluster; and
    select one of the identified media servers in the cluster to connect to the caller based on a load-balancing policy implemented by the MGC device;
    maintain, via the MGCP stack, a state of a connection between the caller and the selected one of the identified media server; and
    reference, via the Layer 3 multicast communications toolkit, the maintained state of the connection at the MGCP stack when a media server is added or removed from the cluster.

10. The system of claim 9, wherein the MGC further operable to:
    send the command to the selected media server; and
    receive a response to the command from the selected media server that causes a connection to be established between the caller and the selected media server.

11. The system of claim 10, wherein a connection between the caller and the MGC is via a Session Initiation Protocol (SIP) connection, and wherein the connection between the caller and the selected media server is via a Real-Time Transport Protocol (RTP) connection.

12. The system of claim 9, wherein the one or more media server of the cluster utilize an application server microcontainer architecture.

13. The system of claim 9, wherein the MGC is a communications platform application server.

14. The system of claim 9, wherein any additional requests to the MGC associated with the connection between the caller and the selected media server are sent to the selected media server.

15. The system of claim 9, wherein additional media servers may be added to the cluster during runtime and any of the one or more media servers may be removed from the cluster during runtime, and wherein the Layer 3 multicast communications toolkit is aware of the additional media servers and the removed media servers.

16. A non-transitory machine-readable storage medium including data that, when accessed by a processing device, cause the processing device to perform operations comprising:
 receiving, at a media gateway controller (MGC) device comprising the processing device, a request from a caller to connect with a media server;
 sending, by the MGC device to a media gateway control protocol (MGCP) stack of the MGC device, a command to establish a connection between the caller and the media server and comprising a name of a cluster that is communicably coupled to the MGC device and hosts one or more media servers comprising the media server;
 utilizing a Layer 3 multicast communications toolkit, by the MGC device via the MGCP stack, to:
 identify the one or more media servers in the cluster; and
 select one of the identified media servers in the cluster to connect to the caller based on a load-balancing policy implemented by the MGC device;
 maintaining, via the MGCP stack, a state of a connection between the caller and the selected one of the identified media server; and
 referencing, via the Layer 3 multicast communications system toolkit, the maintained state of the connection at the MGCP stack when a media server is added or removed from the cluster.

17. The non-transitory machine-readable storage medium of claim 16, the machine-readable storage medium includes data that, when accessed by the processing device, cause the processing device to perform further operations:
 sending the command to the selected media server; and
 receiving a response to the command from the selected media server that causes a connection to be established between the caller and the selected media server.

18. The non-transitory machine-readable storage medium of claim 17, wherein a connection between the caller and the MGC is via a Session Initiation Protocol (SIP) connection, and wherein the connection between the caller and the selected media server is via a Real-Time Transport Protocol (RTP) connection.

19. The non-transitory machine-readable storage medium of claim 16, wherein any additional requests to the MGC associated with the connection between the caller and the selected media server are sent to the selected media server.

20. The non-transitory machine-readable storage medium of claim 16, wherein additional media servers may be added to the cluster during runtime and any of the one or more media servers may be removed from the cluster during runtime, and wherein the Layer 3 multicast communications toolkit is aware of the additional media servers and the removed media servers.

* * * * *